Figure 1:
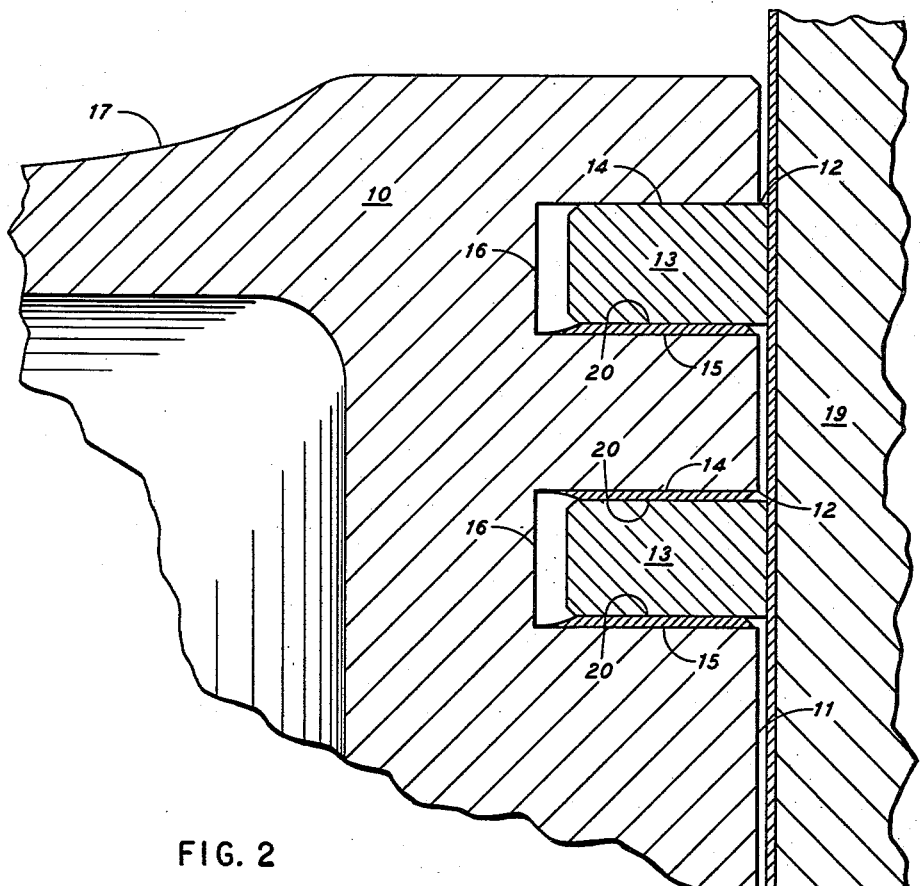

June 25, 1963 G. L. NEELY 3,095,204
WEAR-RESISTANT LINING FOR PISTON-RING GROOVE
Filed March 8, 1961

INVENTOR
GEORGE L. NEELY
BY
ATTORNEYS

United States Patent Office 3,095,204
Patented June 25, 1963

3,095,204
WEAR-RESISTANT LINING FOR PISTON-RING GROOVE
George L. Neely, Berkeley, Calif., assignor to California Research Corporation, San Francisco, Calif., a corporation of Delaware
Filed Mar. 8, 1961, Ser. No. 94,273
6 Claims. (Cl. 277—189.5)

This invention relates to a piston usable in piston-type mechanisms and particularly in diesel engines operating on high-sulfur fuels which are very corrosive. It further relates to the combination of a conventional or a corrosion- and wear-resistant metal piston ring in a groove of a piston, the groove having either or both of its side faces coated with a bonded layer of very hard, wear-resistant material.

Heretofore, various combinations of hard coatings have been employed on certain wearing surfaces of pistons and piston rings operating in the cylinder of diesel engines. The pistons are provided with one or more circumferential grooves in which are resilient rings which bear against the cylinder wall. These rings may be the usual cast iron or steel or alloy materials, and act to form a seal between the piston and the wall. Due to its superior hardness, chromium alloy inserts and metallic chromium plating have been proposed on certain of the faces, namely, the face of the cylinder, a removable liner for the cylinder, the periphery of the piston ring, and even the side faces of the piston ring. Additionally, inserts of chromium-iron alloy strips have been proposed for the side faces of the ring grooves.

All of the foregoing have been open to serious objections, particularly in the matter of side wear of the piston rings and the flat surfaces of the grooves in the body of the piston. The grooves in which the rings are placed tend to wear severely, particularly on that side face where the greatest thrust occurs due to explosion cycles of the engine operation. Such wear increases the side clearance between the ring and the groove and leads to frequent ring breakage, with subsequent loss of engine power, scoring of cylinder walls, and the like.

The principal objective of this invention is to provide a hard, securely bonded, abrasion- and corrosion-resistant coating for the side faces of the ring grooves. The abrasion- and corrosion-resistant coating on these side faces of the ring grooves are terminated, as by chamfering, at the edge or corner between the outer curved face and the side face of the piston land, so that contact between the coating and the cylinder wall or liner is prevented. Furthermore, this coating is diminished in thickness at or near the root of the piston groove which is where the back, curved face of the groove and the flat sides of the groove intersect.

It has been determined by repeated engine tests that reducing groove wear by means of the wear- and corrosion-resistant coating results in a simultaneous, marked reduction in wear of the opposing face of the piston ring. Thus, not only is the life of the piston itself increased by practicing this invention, but also the life of piston rings. This simultaneous reduction in wear means that ring groove clearance is maintained at acceptable limits over a much longer period of time with accompanying savings in engine maintenance.

Other objects and advantages will be apparent from the following specification, taken in connection with the attached drawing, which illustrates a preferred embodiment of the invention.

In the drawing:

FIG. 1 is a vertical sectional view to a greatly enlarged scale of a part of a piston having two circumferential rings in suitable grooves and the piston ring operating in a chromium-plated or -lined cylinder. As indicated, at least one side face of the piston groove is coated with a metallic layer that is deposited or bonded, as by electroplating, in a particular form. The particular configuration of the finished groove is accomplished in accordance with the present invention.

Figure 2:
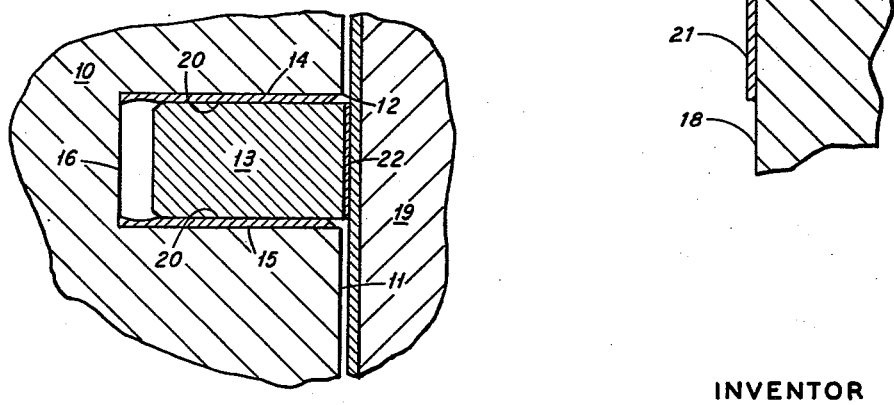

FIG. 2 illustrates an alternate embodiment of FIG. 1 wherein the circumferential surface of the piston ring is covered with a hardened surface applied either by heat treating or as a coating such as ceramic.

Referring to FIG. 1, reference numeral 10 designates the body of the cylindrical piston, desirably of a ferrous metal alloy having a peripheral cylindrical rubbing face 11, and two circumferential grooves 12 in each of which is positioned a resilient metal piston ring 13. Each groove 12 has the usual parallel opposed side faces 14 and 15 and a back face 16. In this example, the upper side face 14 of each groove is the one nearest the top 17 of the piston 10.

This arrangement acts to seal the annular space between the face 11 of piston 10 and the opposed face of the liner 21 for cylinder bore 18 of the engine cylinder block 19, in the manner and for the purposes commonly employed heretofore in this art.

The principal departure from the prior art arrangement just described is the provision, on at least the lower side face 15 of either or both ring grooves 12 of an electrolytically deposited, hard, smooth metallic coating 20, as for example, chromium. In this example, the upper groove 12 has the hard coating only on the lower side face 15, while the lower groove has the hard coating 20 on both side faces 14 and 15.

As further indicated in FIG. 1, coating 20 is chamfered or otherwise undercut at the corners formed by ring grooves 12 and metallic coating 20. The purpose of such undercutting is to prevent contact between the coating 20 in the groove and the chromium that may be included on the liner or plated surface 21 on cylinder wall 18. This undercutting is important because piston 10 is forced by gas pressure on piston head 10 against the cylinder wall 21 and, as is well known, wear is increased rather than decreased when two chromium-containing or -plated surfaces rub against each other. Thus, if coating 20 is not stopped short of the edge of grooves 12, scoring or cutting of cylinder wall 21 will result.

It will also be notice that the coating 20 is thinner at the root or bottom face 16 of grooves 12. Such thinner plating is advantageous in that it prevents the formation of a hard shoulder, or step, at the base of the groove as the sides of the ring lands wear. Such a step will cause ring breakage particularly when new rings of standard diameter are installed, because they are not able to compress to the full depth of the groove. Desirably, the area of wear surface 20 is not decreased by the chamfer and diminished root thickness more than about ten percent; hence, 90 percent of surface 20 is available for support of rings 13.

This invention is thus characterized by an electrolytically deposited hard coating 20 of a metallic coating about 0.003 to 0.010-inch thick on one or both of the side faces 14 and 15 of the piston-ring groove. Whether or not the top face 16 of the groove 12 is so coated is less important in the two-stroke cycle engine where the ring load is uni-directional.

The metal or alloy analysis of the piston ring, and the presence of absence of a hard coating on the ring, may vary throughout wide ranges. For example, the ring 13 may be fabricated of the conventional hard, simple cast iron or steel of the usual carbon content, or may contain a suitable percentage of alloying materials, such as nickel or chromium, or even, as indicated in FIG. 2, a hard peripheral coating 22 of ceramic, to render it resistant to both corrosion and wear or abrasion. Desirably, it should have a wearing-surface hardness above about 40 on the Rockwell "C" scale, which is obtained by a suitable choice of composition and subsequent heat treatment. A complete recitation of such properties and analyses is outside the scope of this application, so that they need not be given in this specification.

A principal advantage of this invention resides in the fact that the hard layer 20 is on the piston body rather than on any part or face of the ring or on any part of the vertical side wall 11 of piston 10. It has been found that, while piston rings with chromium-plated sides have been proposed, the hard, brittle, chromium layer destroys the resiliency of the finished piston ring, so that it cannot easily or safely be expanded to be placed over the body of the piston and then be reduced in diameter by its resiliency to enter the groove unless the coating is extremely thin. When this is attempted with coatings thick enough to reduce wear over a period of time, the piston ring will break. Even if such a ring is successfully installed, it will usually have a very short life under the variable loading that it receives in diesel engine service due to stress concentrations caused by minute cracks in the chromium surface.

Additionally, the hard deposit layer 20 on the side face 14 or sides of the ring groove 12 can be used to build up worn pistons having previously worn grooves to the proper dimensions and finish of the latter. Also, such a layer cannot become loose in service, nor will it interfere with heat flow from the piston body to the rings and thence to the cylinder wall as is the case where separate, unbonded metal-alloy inserts are used.

The present application is a continuation-in-part of my application Serial No. 736,003 filed May 19, 1958, now abandoned.

The procedure or equipment for applying the chromium coating to the side walls of the groove forms no part of this invention, as it involves electroplating and finishing operations well known to those skilled in that art. It may involve undercoatings of copper, nickel, or other nonferrous metals to improve the ultimate bond of the hard smooth or porous metallic chromium deposit on the side wall of the groove that is the essential feature of this invention.

As used in this specification, the term "chamfered" is meant to include either a machine operation to remove excess metal or an electroplating technique to avoid original deposition of metal at the corner of groove 20 and the side wall of the piston.

Among other wear-resistant materials that may be substituted for dense or hard chromium is molybdenum.

I claim:

1. For use in an internal combustion engine adapted to burn high sulfur fuel and which has the walls of its cylinders lined with a material containing chromium, the combination of a ferrous metal piston being provided with at least one circumferential groove having parallel side faces, a thin layer of metallic chromium bonded to that side face of said groove against which the greatest thrust occurs during reciprocation of said piston in one of said cylinders, and said thin layer being chamfered to prevent chromium-to-chromium contact between chromium at the corner of said groove and the chromium-containing material on the walls of said cylinder.

2. The combination in accordance with claim 1 in which a resilient metal piston ring is positioned in said groove, said ring having a corrosion-resistant peripheral wearing face for engaging a wall of one of said cylinders, said wearing face having a hardness greater than about 40 on the Rockwell "C" scale, said metal of the body portion of said ring being chosen from the group consisting of cast iron, steel, chromium-iron alloy, and nickel-iron alloy, and said ring body portion including its side faces thereof that engage said chromium-bonded side faces of said groove being uncoated and untreated to prevent contact between said chromium and said ring wearing face.

3. The combination in accordance with claim 2 in which the metal of and body portion of said piston ring is selected from the group consisting of chromium-iron alloy and nickel-iron alloy and the corrosion-resistant peripheral wearing face of said ring is formed by heat-treating the surface of said body portion of said ring.

4. The combination in accordance with claim 2 in which said wearing face of said metal piston ring is coated with ceramic.

5. For use in a reciprocating piston engine having cylinders lined with a wear-resistant material, a metal piston having at least one circumferential groove that includes parallel side faces, a thin layer of wear-resistant material bonded to that side face of said groove against which the greatest thrust occurs during reciprocation of said piston in a cylinder of an engine, said thin layer being chamfered at the side wall of said piston to prevent contact between said wear-resistant material and the wear-resistant material forming the side wall of said cylinder and said layer being reduced in thickness at the root of said groove to prevent creation of a step in said side wall as said wear-resistant material is reduced in thickness by normal wear.

6. A piston in accordance with claim 5 in which the area of said wear-resistant material layer in said groove is not decreased more than about 10% by said chamfer and by said reduction in thickness at said root.

References Cited in the file of this patent

UNITED STATES PATENTS

| | | |
|---|---|---|
| 1,717,750 | Wills | June 18, 1929 |
| 1,741,643 | McClure | Dec. 31, 1929 |
| 2,267,368 | Bowers | Dec. 23, 1941 |
| 2,281,426 | Farr | Apr. 28, 1942 |
| 2,403,455 | Phillips | July 9, 1946 |
| 2,410,405 | Cornelius | Nov. 5, 1946 |
| 2,488,697 | Ackerman | Nov. 22, 1949 |
| 2,554,289 | Anderson | May 22, 1951 |
| 2,575,214 | Garland et al. | Nov. 13, 1951 |
| 2,833,264 | Dailey et al. | May 6, 1958 |
| 2,905,512 | Anderson | Sept. 22, 1959 |
| 2,978,284 | Daub | Apr. 4, 1961 |